(12) United States Patent
Selwa

(10) Patent No.: US 9,771,701 B2
(45) Date of Patent: Sep. 26, 2017

(54) HYDROCARBON PRODUCTION AND STORAGE FACILITY

(71) Applicant: SLLP 134 LIMITED, Aberdeen (GB)

(72) Inventor: Richard Selwa, Blairgowrie (GB)

(73) Assignee: SLLP 134 Limited, Aberdeen (GB)

( * ) Notice: Subject to any disclaimer, the term of this patent is extended or adjusted under 35 U.S.C. 154(b) by 0 days.

(21) Appl. No.: 14/911,386

(22) PCT Filed: Aug. 15, 2013

(86) PCT No.: PCT/GB2013/052168
§ 371 (c)(1),
(2) Date: Feb. 10, 2016

(87) PCT Pub. No.: WO2015/022476
PCT Pub. Date: Feb. 19, 2015

(65) Prior Publication Data
US 2016/0186401 A1    Jun. 30, 2016

(51) Int. Cl.
*B63B 35/44* (2006.01)
*E02B 17/02* (2006.01)
(Continued)

(52) U.S. Cl.
CPC .......... *E02B 17/02* (2013.01); *B01D 17/0208* (2013.01); *B01D 19/0036* (2013.01); *B63B 35/44* (2013.01); *C10G 31/06* (2013.01); *C10G 31/09* (2013.01); *C10G 33/06* (2013.01); *E21B 43/36* (2013.01); *B63B 22/06* (2013.01); *B63B 22/28* (2013.01); *B63B 2035/4486* (2013.01); *C09K 2208/22* (2013.01); *C10G 2300/1033* (2013.01); *C10G 2300/4062* (2013.01)

(58) Field of Classification Search
USPC .......................... 405/205, 210; 114/256, 257
See application file for complete search history.

(56) References Cited

U.S. PATENT DOCUMENTS 4,664,556 A * 5/1987 Dixon ..................... E02D 15/06
405/195.1
4,907,912 A * 3/1990 Smith ................... E02B 17/021
141/82
(Continued)

FOREIGN PATENT DOCUMENTS

GB        1366770 A      9/1974
GB        2336384 A     10/1999
(Continued)

OTHER PUBLICATIONS

PCT Search Report & Written Opinion (PCT/GB2013/052168), dated Jul. 6, 2015.

*Primary Examiner* — Sean Andrish
(74) *Attorney, Agent, or Firm* — Gregory L. Porter; Andrews Kurth Kenyon LLP

(57) ABSTRACT

A subsea fluids storage facility comprises a tank (11) for holding and separating fluids which is equipped with ballast capacity (14) and a separable base (12) to be deployed upon the seabed in shallow or deep water, and the storage facility is connectable to a surface production facility, especially a buoy (24) for processing fluids. In deep water the tank (11) is held at a depth above the base (12) for temperature controlled stabilization of produced oil in the tank (11).

20 Claims, 18 Drawing Sheets

(51) Int. Cl.
*E21B 43/36* (2006.01)
*B01D 17/02* (2006.01)
*C10G 33/06* (2006.01)
*B01D 19/00* (2006.01)
*C10G 31/06* (2006.01)
*C10G 31/09* (2006.01)
*B63B 22/06* (2006.01)
*B63B 22/28* (2006.01)

(56) References Cited

U.S. PATENT DOCUMENTS

| | | | | |
|---|---|---|---|---|
| 5,117,914 | A * | 6/1992 | Blandford | E21B 43/017 166/344 |
| 7,037,947 | B2 * | 5/2006 | Font Freide | B01J 8/22 405/203 |
| 7,128,153 | B2 * | 10/2006 | Vinegar | B09C 1/02 166/245 |
| 2002/0154954 | A1 | 10/2002 | Huang et al. | |
| 2008/0041291 | A1 | 2/2008 | Horton et al. | |
| 2011/0135390 | A1 * | 6/2011 | Millheim | B63C 1/02 405/3 |
| 2011/0146993 | A1 * | 6/2011 | Sahni | E21B 43/20 166/305.1 |

FOREIGN PATENT DOCUMENTS

| | | |
|---|---|---|
| NL | 1022644 C2 | 8/2004 |
| WO | 2004035375 A1 | 4/2004 |

* cited by examiner

HYDROCARBON PRODUCTION AND STORAGE FACILITY

FIELD OF THE INVENTION

This invention relates to the field of offshore petroleum production, and provides a submersible hydrocarbon fluid storage and water separation facility useful in the recovery of oil and gas from a subsea well. A process for recovery of hydrocarbon fluids is also provided.

BACKGROUND TO THE INVENTION

Considerable efforts have been made in the petroleum industry to exploit offshore resources i.e. hydrocarbon oil and gas-bearing reservoirs which are accessible from a marine vessel or offshore installation via a riser connected to a subsea wellhead. Whereas many reservoirs have been accessible by coastal inshore or shallow water facilities, increasingly prospecting for such reservoirs is conducted in challenging deep marine environments. The facilities required for production and export of the hydrocarbons have become correspondingly complex and expensive. The literature on vessels and structures designed for this purpose is extensive.

Whereas the oil and gas resources have been typically produced under natural flow or artificial lift during the early life of the field, as the reservoir becomes depleted a cost of capital and operating expenditure versus recovery value assessment may lead to a need to discontinue operations whilst the reservoir retains significant volume of remaining potentially extractable hydrocarbon resources. Maintaining a dynamically positioned vessel on station above a wellhead for example is expensive in terms of capital and operating expenditure and involves risk to operating personnel and potential risk to the environment e.g. if a storm drives the vessel off station and damage to the riser occurs.

Therefore, at some stage, a cost and risk assessment may indicate that it is no longer viable to continue production from the subsea well with that vessel or installation and the well may be sealed and abandoned leaving unrecovered hydrocarbon reserves.

Accordingly, it would be of value to the industry to devise alternative means for continuing the production of hydrocarbon without requiring the presence of a dynamically positioned vessel, production platform or the like manned structure.

Achievement of this objective would also permit exploitation of small fields of relatively modest hydrocarbon reserves which according to traditional methods would be considered too small to exploit economically.

SUMMARY OF THE INVENTION

According to an aspect of the present invention, there is provided a subsea fluids storage facility comprising a tank for holding and separating fluids which is equipped with ballast capacity and a separable base to be deployed upon the seabed. The storage facility is designed to be towed to site and deployed to a subsea position in shallow or deep water.

The separable base is designed to settle on the seabed, for a wide variety of conditions and in use remains associated with the tank by provision of tethers so that the tank can be positioned with respect to a selected base location. The base may be a gravity base and additionally or in the alternative, the base may be settled by use of suction for example where the seabed interface between sea and formation or "mud line" consists of soft sediments or unstable unconsolidated materials.

Optionally, the base may be deployed separately from the tank which may be deployed subsequently for attachment to the base by tethers or the like.

The storage facility may comprise ballast tanks associated with the tank and optionally separable therefrom. The ballast tanks may be selected from a range of sizes to suit operational needs. The ballast tanks may be remotely detachable. The sizes may range from tall narrow diameter cylindrical designs to squat large diameter ballast tanks. Alternative shapes of ballast tank may be adopted instead of cylindrical designs. The ballast tanks may use air, dense fluids or gels, and displacement water depending upon the deployment depth under consideration. The ballast tanks may comprise detachable feet for resting on the subsea surface and be connectable to the tank such that the ballast tanks can act as supports to elevate the tank above the subsea surface sufficiently to compensate for variable sea bed soil conditions and to minimise scour when the tank is to be deployed in shallow depths inshore. The detachable feet may be decoupled from the ballast tanks by use of an underwater ROV. Raising the tank by a couple of meters is typically sufficient to mitigate scour problems. Scour is a known phenomenon occurring around subsea structures around which local erosion of the subsea surface is observed. Unchecked scour can destabilise the structures and increase fatigue and shorten operational life.

In embodiments, by controlling ballast the tank may be allowed to sink to a selected depth and restrained at that depth e.g. using tethers to a surface vessel or buoyancy device. In this manner of deployment, the tank neither settles on the base nor rides on the surface. The tank may be maintained on station over the base by the provision of tethers to the base located on the seabed.

A purpose of the positioning of the tank at an intermediate depth, say 100 meters, is to facilitate a temperature control of fluids stored in the tank so as to achieve temperature based oil stabilisation and separation of volatiles especially n-isobutane, and water from the oil. Oil stabilisation is a familiar process in the art which has been conducted onshore by measures which generally involve changes in pressure and temperature to encourage the separation of lower hydrocarbon (light) gases and water and to minimise formation of emulsions. An important aspect of embodiments of the present invention is the provision of a submerged separation tank which is positioned at an intermediate depth determined to facilitate temperature stabilisation of oil. The depth selected may take account of the wave base to minimise adverse wave and/or current influence on the facility.

An outer surface of the tank may have protruding parts to mitigate vortex effects upon the storage facility. Vortex shedding or mitigating devices may comprise continuous or discontinuous ribs, fins, strakes or ridges extending over the surface, optionally in a curved path. The vortex shedding devices may follow a helical path around the tank. The vortex shedding devices may be provided upon an exterior side wall surface of the tank. Similar vortex shedding devices may be provided upon ballast tanks associated with the tank.

Embodiments of the tank have rounded portions shaped to manage pressure. The base wall of the tank may be curved to have a part which is torispherical, semi-ellipsoidal, hemispherical, dished or conical. The base of the tank may be outwardly curved.

In embodiments, the top wall or head of the tank may be curved to have a part which is torispherical, semi-ellipsoidal, hemispherical, dished or conical. The head of the tank may be outwardly curved.

In embodiments the base wall and the head of the tank may be of like shape but oppositely oriented so that the base wall is the inverse orientation of the head.

The ballast tanks may also have curved base and head parts which may have like shape but oppositely oriented so that the base is the inverse orientation of the head. The shape of the base or head parts of the ballast tanks may be torispherical, semi-ellipsoidal, hemispherical, dished or conical.

The shape of the interior of the tank may facilitate collection by settlement in the base or overhead separation of gas. The interior may include a central separator zone defined within a column wall, the zone being configured to receive produced oil for stabilisation by separation of water and volatiles under a temperature controlled stabilisation process. The upper part of the column wall may be permeable to gas, for example slotted or otherwise foraminated. In embodiments, the lower part of the column wall may define a sludge collection zone above which the column wall is fluid permeable.

A base or head of a tank may have a centrally positioned external connection for a collection conduit such as gas offtake, or sediment/sludge/solids removal may be usefully employed with convex shaped inner tank surfaces since gas will tend to collect at the highest point internally of the tank, and gravity will draw heavy fluids and solids to the lowest point internally of the tank. The lowest point may be provided with a weir or internal sludge confinement wall.

The tank may be provided with double skin walls, at least one of which is adapted to resist pressure at operational depths. The double skin wall may accommodate thermal insulation material.

The separation of oil, water and volatiles especially n-isobutane may be facilitated by provision of heaters in the tank in proximity to a separation tank or tanks. Separation zones may be defined by compartmentalisation of a storage volume configured to receive produced oil from the well. Typically the produced oil will be de-sanded and at least partially de-watered and degassed before collection in the tank.

The submerged tank for stabilising crude oil and separating water and volatiles therefrom would in use be operatively associated with a fixed or floating production facility. A suitable production facility may take the form of a skid mounted unit comprising at least heating, degassing, and de-sanding capability which can be accommodated on the deck of a surface vessel for example, such as a floating production storage and offloading (FPSO) vessel. Also the submerged tank could be connected to any other production facility currently used in the industry such as a production platform of which there are multiple designs adapted to suit inshore and deepwater locations.

Unmanned buoys are well established in the offshore industry for dedicated and limited purposes. They are used currently for utility, power and control of remote wells, or discharge of produced oil to a tanker or FPSO. An unmanned oil production buoy suitable for use with the invention would include oil production equipment within a submersible marine hull containing buoyancy and ballast chambers and below waterline storage and process equipment space, with contingency measures to address adverse events. The equipment within the buoy prepared for use in this invention may include an industry standard de-watering/de-sanding plant, dual or bi-fuelled generators, pumps and gas control equipment for handling produced gas. Appropriate industry standard umbilicals and connectors for risers will be provided for connection of the buoy. Such a buoy controls production from the reservoir and facilitates export of oil when required and delivers other operational services. The buoy would be connected by a riser to the well and by a fluid flow umbilical to the tank. The buoy operational tasks include de-watering and de-sanding produced oil before storage in the treatment tank of this invention. Clean sand may be discharged to sea.

A unique aspect of the buoy to be used in the deployment of the tank of this invention is that the hull is provided with multiple tether points e.g. as feet extending from a lower surface of the hull at spaced intervals around the hull. These are useful for tethering the separable tank to the buoy.

In use the tank, when not settled upon the gravity base in a shallow water location, is suspended below the production buoy at an intermediate water depth conducive to a temperature stabilisation process for the produced oil collected in the tank. A longer residence time in the tank favours temperature stabilisation of produced crude oil.

Multiple tanks of the invention may be linked together to increase capacity and prolong unmanned operational periods before offloading to a vessel.

In another aspect of the present invention, there is provided a process for separation of water and volatiles especially n-isobutane, from oil which comprises collecting oil in a submerged storage tank which is at a depth allowing temperature-based separation of water and oil.

The tank may comprise a single oil/water storage volume with internal compartmentalisation using dividers or baffles sufficient to provide a degree of segregation to facilitate the oil/water separation process and inlet and outlets for fluids are preferably positioned to minimise impact of inward and outward fluid flow disturbance upon the separating fluids.

The tank is preferably sealed with only access and egress of fluids, heat and power via the point of connection to a riser.

The tank typically operates at a slightly higher pressure than its hydrostatic surrounds. This promotes fluid offloading.

The separation process is essentially a passive process achievable by standing or settlement time following production, and preliminary degassing and de-sanding prior to collection in the separator tank, and is facilitated by judicious application of heat derived from either produced reservoir gas consumption or collection of volatiles separating from the oil/water crude hydrocarbon mixture produced from the reservoir or via the engine power generation directly. The tank may be insulated to an amount sufficient to secure the benefit of the heat available from the natural resources optionally topped up by supplying heat from heaters utilising contingency diesel fuel supplies provided to damp out fluctuations in available gas or volatiles and which may be utilised on start-up. It is contemplated that heating in the range of 1.0 MW to 5.0 MW may be required. A temperature of about 80° C. is suitable for degassing the produced oil, and maintaining the separation process in the tank which typically holds the produced fluids for a lengthy residence time, perhaps in the range of 8 to 60 days or more. Separation under heating for an extended residence time allows separation of oil and water to <20 ppm which betters current UK regulations of <30 ppm oil in water. The process aims to achieve a stabilised crude to the required Reid Vapour Pressure 0.7 bara, suitable for tanker export. Test methods are known in the industry for this purpose e.g.

ASTM D323, D4953, ISO 3007, IP 69, which methods can be conducted using automatic apparatus. The base solids and water specification for the produced crude suitable for tanker export would be about 0.5% w/w.

The temperature controlled process for separation of water and volatiles from oil produced from a reservoir may require a heating intervention, and gas produced from the reservoir may be throttled to meet that demand for heat only i.e. the gas is only used as a fuel to generate heat and is usually neither exported nor flared. Should the produced gas be subject to fluctuations or otherwise insufficient to meet fuel consumption the meager gas supply may be augmented by provision of stand-by reserves of an alternative fuel such as diesel, or any conveniently available hydrocarbon gas such as methane, or propane, or butane for example, as typically used for bi-fuel or dual fuel engines and heat boilers. This approach to field management will provide for slower field exploitation which is less likely to cause damage to the formation and thus prolongs field life.

In various embodiments of the tank, it is compartmentalised such that there is provided a central separator tank with optionally removable upper and lower parts, oil storage and water separation internal divisions, with delivery and recovery systems, and contingency measures for use with the BOP.

The compartmentalisation allows provision of:
a. Central separator tank
b. Removable base and top of settling tank
c. Oil storage and water separation internals
d. Emergency response system for BOP The storage facility comprising the compartmentalised tank for receiving produced oil fluids for separation of oil, water and volatiles especially n-isobutane, and storage achieves at least the following functions:
i) Two stage oil water separation
ii) High residence time oil in water separation
iii) Emergency response The design of the tank is to allow lightweight concrete or steel construction of up to circa 200,000 bbl nominal storage facility and process operating system. Temperature cycling compensation from zero to 80 Deg C. is determined via the materials of construction which may include appropriate insulation. Use of an appropriate closed circuit heat transfer fluid circulation system with process temperature sensors for monitoring purposes and utilising a glycol or oil based fluid or electric heating coils are proposed. Gas consumed as fuel may be used to generate electricity and the electricity used to power heating elements and provide heat to the process.

Typically the tank used in the storage facility of this invention is sealed with respect to the environment. Export or offload to tanker may be achieved by positive pressure by control of production fluids, by use of displacement water from the buoy. Maintaining a slightly higher positive pressure in the tank than its surroundings, promotes crude offloading and produced water disposal.

The invention will now be described with reference to the accompanying drawings.

DESCRIPTION OF THE DRAWINGS

as illustrated in FIGS. 23 & 24;

DESCRIPTION OF EMBODIMENTS

Figure 1:
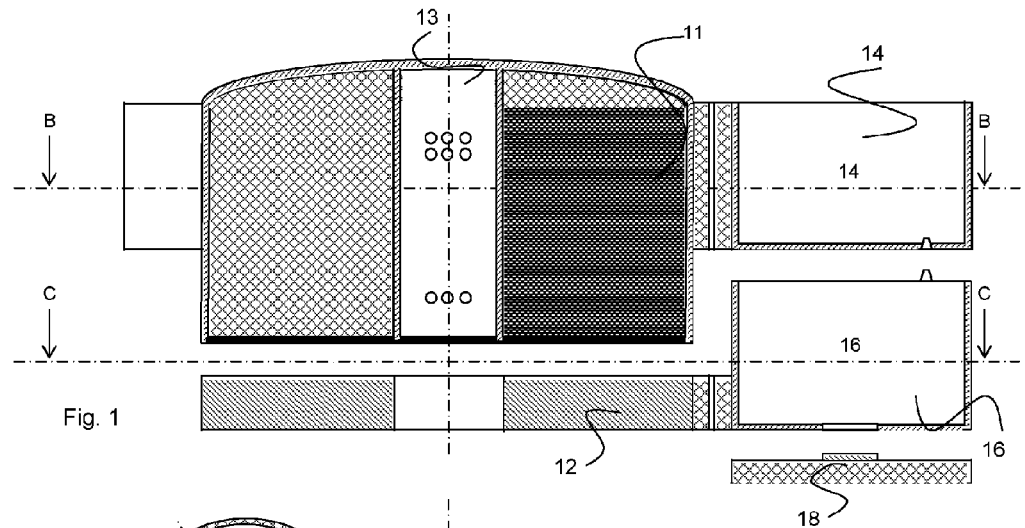
FIG. 1 illustrates a side view of an embodiment of the tank and separable base with associated ballast tanks and detachable feet at section A-A of FIG. 2.

Referring to FIG. 1, a deployable and recoverable storage facility comprises a storage tank 11 associated with a separable gravity base 12, and ballast tanks 14, 16, respectively for each of the storage tank 11 and the gravity base 12. Multiple ballast tanks 14, 16, (only one shown) are provided around the storage facility. Releasable feet 18 which may be configured for height adjustment to compensate for variable seabed conditions are attached to each of the base ballast tanks.

The storage tank 11 includes a central separator zone 13 configured to receive produced oil for stabilisation by separation of water and volatiles under a temperature controlled stabilisation process.

Figure 2:
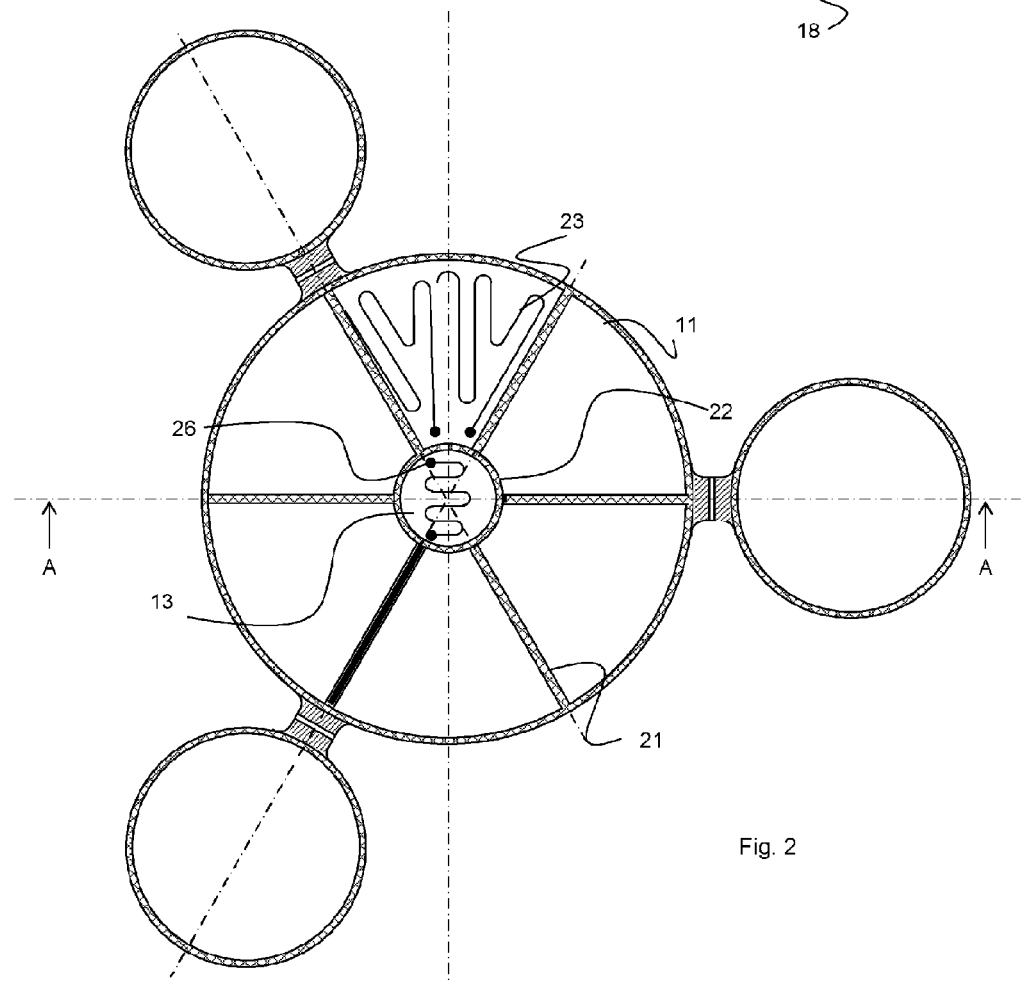
FIG. 2 shows a plan view of a heated section of the tank with associated ballast tanks at section B-B of FIG. 1.

Referring to FIG. 2, the storage tank 11 is compartmentalised by radially extending internal walls 21 around the central column separator zone 13 which is defined by an upright tubular column 22. Each sector shaped compartment may include a heater element 23 for maintaining a desired temperature profile therein.

The heater elements 23 may be formed of a tubular element the length of which is accommodated in the space by e.g. successive returns to form a serpentine flow path, or spiral, or coil, or other convoluted shapes.

The tubular elements contain either a glycol or oil based fluid heat transfer fluid. In some embodiments of the invention, heat is provided by electrical heaters.

The central separator zone 13 also is provided with a heater element 26 to heat produced oil received therein.

Figure 3:
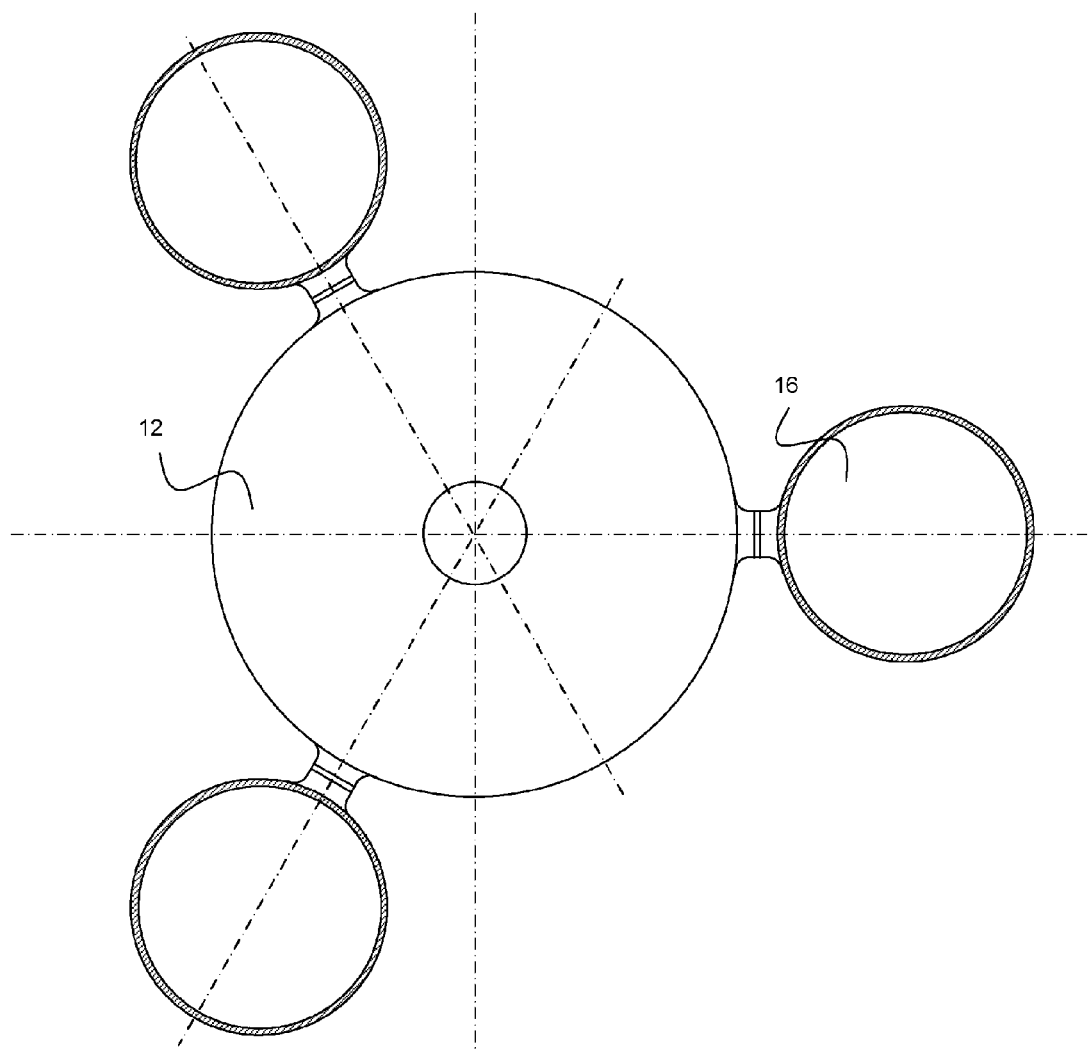
FIG. 3 shows a plan view of the base at section C-C of FIG. 1.

Referring to FIG. 3, a separable gravity base 12 comprises a base for releasably receiving the storage tank 11, and base associated ballast tanks 16 which are supported upon releasable feet 18.

Referring to FIGS. 1 and 2, the storage tank 11 is sealed with respect to the environment in use, and is provided with industry standard ports and associated couplings for connection of riser, communications, fluids and service umbilicals, and anchor and tether lines etc. (not shown).

In use, fluids flow from the subsea well via either natural pressure, or by water injection using a raw sea water pump, powered from a local facility such as a surface vessel, FPSO, platform or preferably a dedicated production buoy 24 with appropriate facilities including heaters, degassing and export functionality. Artificial lift using an ESP or for heavy oil ESPCP may be used to deliver fluids into the buoy 24. The fluids arrive at the subsea tree where they are choked back to regulate the pressure at the seabed.

Flexible risers then transport fluids from the production tree into the buoy 24 where if there are several wells they pass through a multiphase meter. Production fluids from the well(s) enter the buoy and are comingled in the production header before routing to the degasser/de-sander vessel. Well fluids then pass into the de-gasser/de-sander where the gas is flashed off under near atmospheric pressure and heating. Sand can be removed if required and disposed to sea using turbine oil re-claiming equipment (TORE clean up system).

Gas which is removed is then sent to selected zones to:
a) Provide fuel for power for the 10 MW engines (utilising up to 2 million standard cubic feet per day (MMSCFD), where 1 MMSCFD approximates to 28316.847 m$^3$ per day @ 60° F./20° C.)
b) Provide fuel to boilers to heat the subsea storage tank via two boilers (utilising a combined 6 MMSCFD)
c) Flaring for emergency response and peak conditions (up to 30 MMSCFD)

Oil and water are then pumped from the buoy 24 down in to the concrete storage tank 11 via the service riser. There the long residence time of fluids within the storage tank 11 combined with the potential to heat the ~200,000 barrel contents means that any remaining vapours can be circulated back to the degasser via a balance line.

The produced water which typically separates to 30 ppm or less is then pumped back or displaced under pressure in to the buoy 24 where it is polished to less than 20 ppm and discharged to sea.

Figure 4:
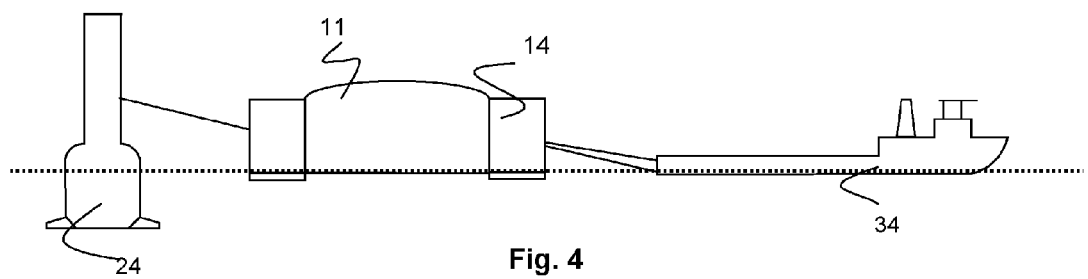
FIG. 4 illustrates the towing of a storage facility together with a production buoy for deployment either as a single or separate operation.
Figure 4A:
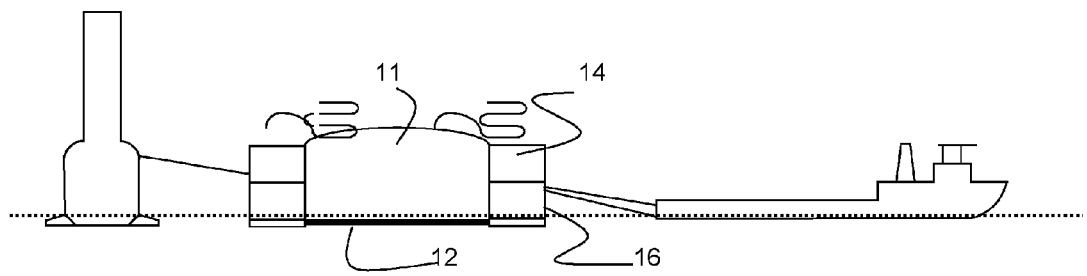
FIG. 4a illustrates the towing of a storage facility with detachable base together with a production buoy for deployment either as a single or separated operation.
Figure 5:
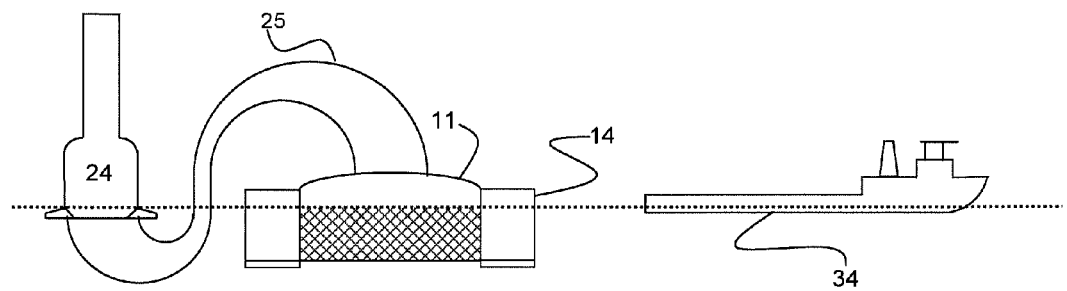
FIG. 5 illustrates an initial flooding stage for deploying the tank.
Figure 6:
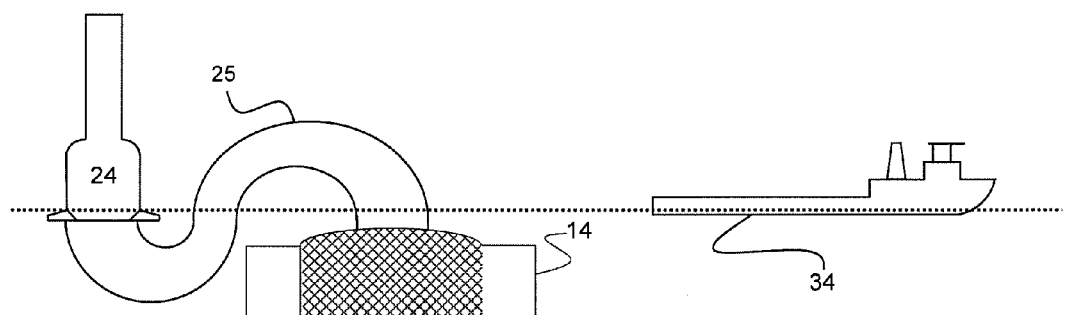
FIG. 6 illustrates a later stage during submerging of the flooded tank.
Figure 7:
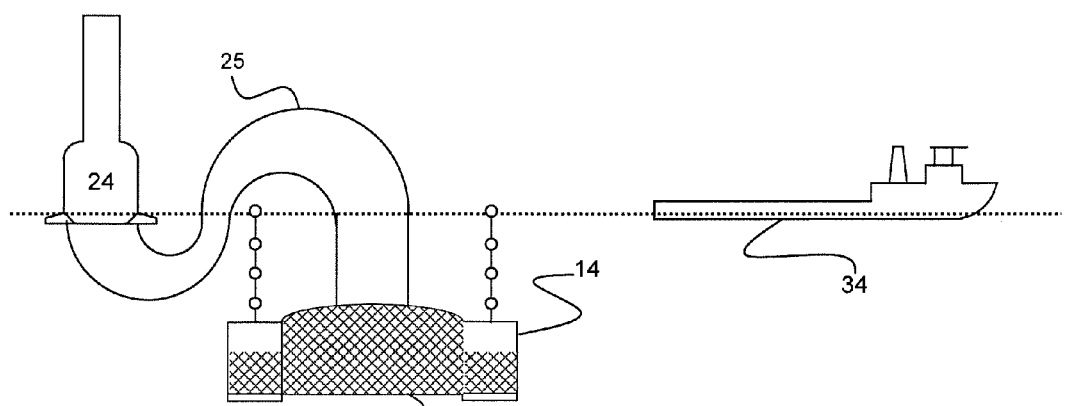
FIG. 7 illustrates a later stage for deploying the flooded tank under ballast control.

There are multiple methods to deploy the separation and storage facility and a selection will be made by consideration of the location of the well e.g. shallow water or deepwater site, the nature of the seabed surface at the wellhead, the potential yield of remaining assets in the formation containing the reservoir, etc. (see FIGS. 4 and 5)

Deployment typically requires the following resources, several service vessels or tugs, a production buoy, and at least one ROV. It is not normally required to provide divers since the deployment operation can be remotely controlled.

Broadly the available methods comprise the steps of:
(i) tow out,
(ii) positioning on site
(iii) ballast control to submerge storage facility (FIG. 5) and/or gravity base either as separate or combined operation
(iv) establish base at wellhead
(v) submerge storage tank 11 to working depth (FIGS. 6, 7, 8 and 9)
(vi) connect storage tank 11 to production buoy 24 by central riser 45 (FIG. 10)
(vii) connect production risers 47, from wellhead 46 to buoy 24 (FIG. 11)
(viii) commission and start up (FIG. 12).

Variants may include additional steps or combinations of the steps (FIGS. 13 to 21).

Installation equipment for the installation in a single trip includes air couplings, suction piling systems, temporary ballasting, descent control systems, location systems and involves the lowering of the storage tank 11 with the buoy 24 attached in such a manner as to ensure a single installation can be achieved with the buoy, tank and tethers or mooring attached and in situ.

In a possible deployment and use of the separation and storage facility, a tow "package" assembly consisting of a suitable oil production buoy and storage tank with gravity base are towed together, typically in tandem to the work location above the wellhead(s). Multiple vessels, typically 3 boats such as tugs or service vessels 34, would be used to position the buoy 24 and storage tank 11 but a lesser number may be used for towing if further vessels may be called upon at the work location.

Figure 8:
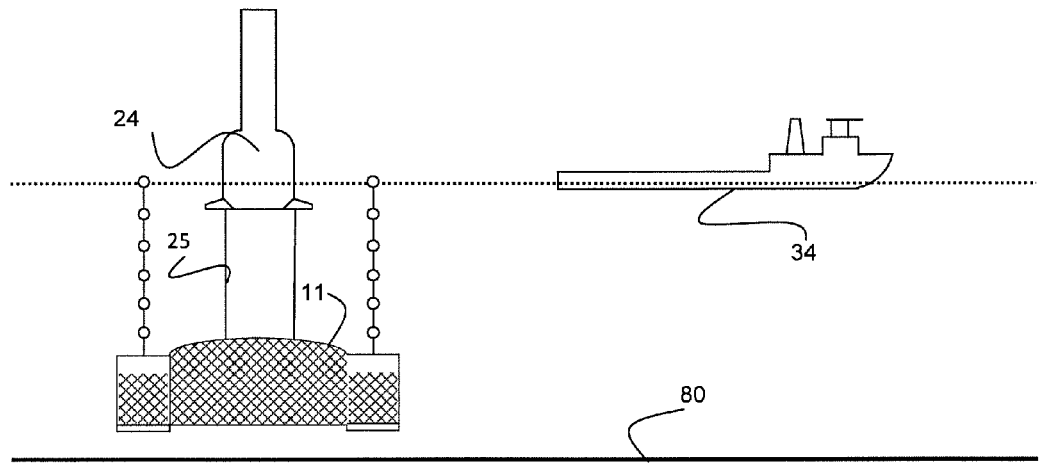
FIG. 8 illustrates positioning the production buoy on station above the tank whilst controlling tank descent to approx. 15 m above seabed by tension of the tethers connected to the buoy.

As a first step, the storage tank 11 connected to the buoy 24 by tethers 25 is partially flooded to submerge it (FIG. 5) and after it is fully flooded (FIG. 6) the storage tank 11 descends under control by ballasts (FIG. 7) to an operational oil processing depth determined by length and tension in the buoy tethers 25. The storage tank 11 may be allowed to descend to about 15 meters above the seabed 80 before deploying the buoy 24 (FIG. 8).

Figure 9:
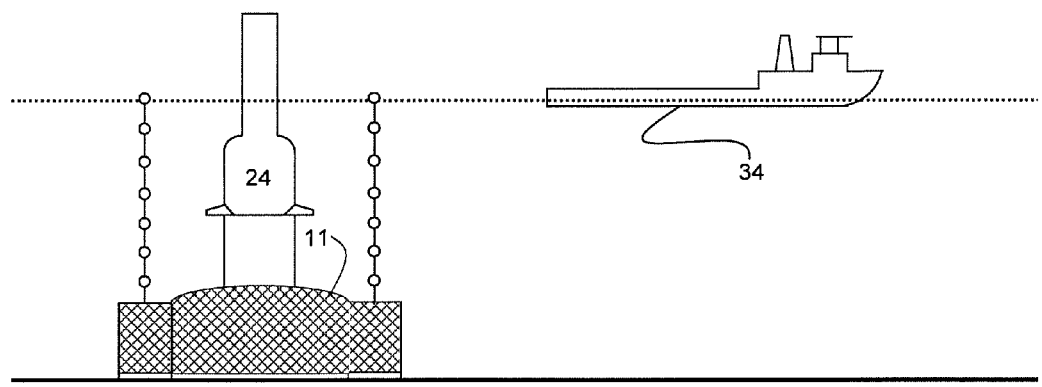
FIG. 9 illustrates the buoy ballasted to operational depth and tank settled to sea bed.
Figure 10:
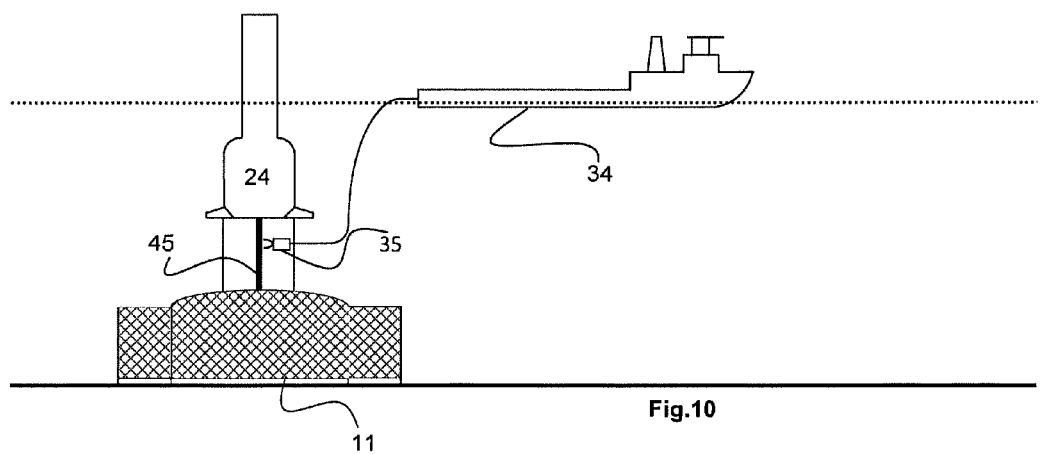
FIG. 10 illustrates connection of a central riser from the tank to the buoy using an ROV controlled from the support vessel.

In a further step, the buoy 24 is ballasted to its operational depth and the storage tank 11 allowed to settle on the sea bed where the wellhead is located in shallow waters (FIG. 9).

In an alternative shallow water situation, the separable gravity base is deployed to the sea floor before the storage tank 11 is submerged to be guided to settle on the base and locked to the base using an ROV 35 (FIGS. 13 to 16).

Figure 22:
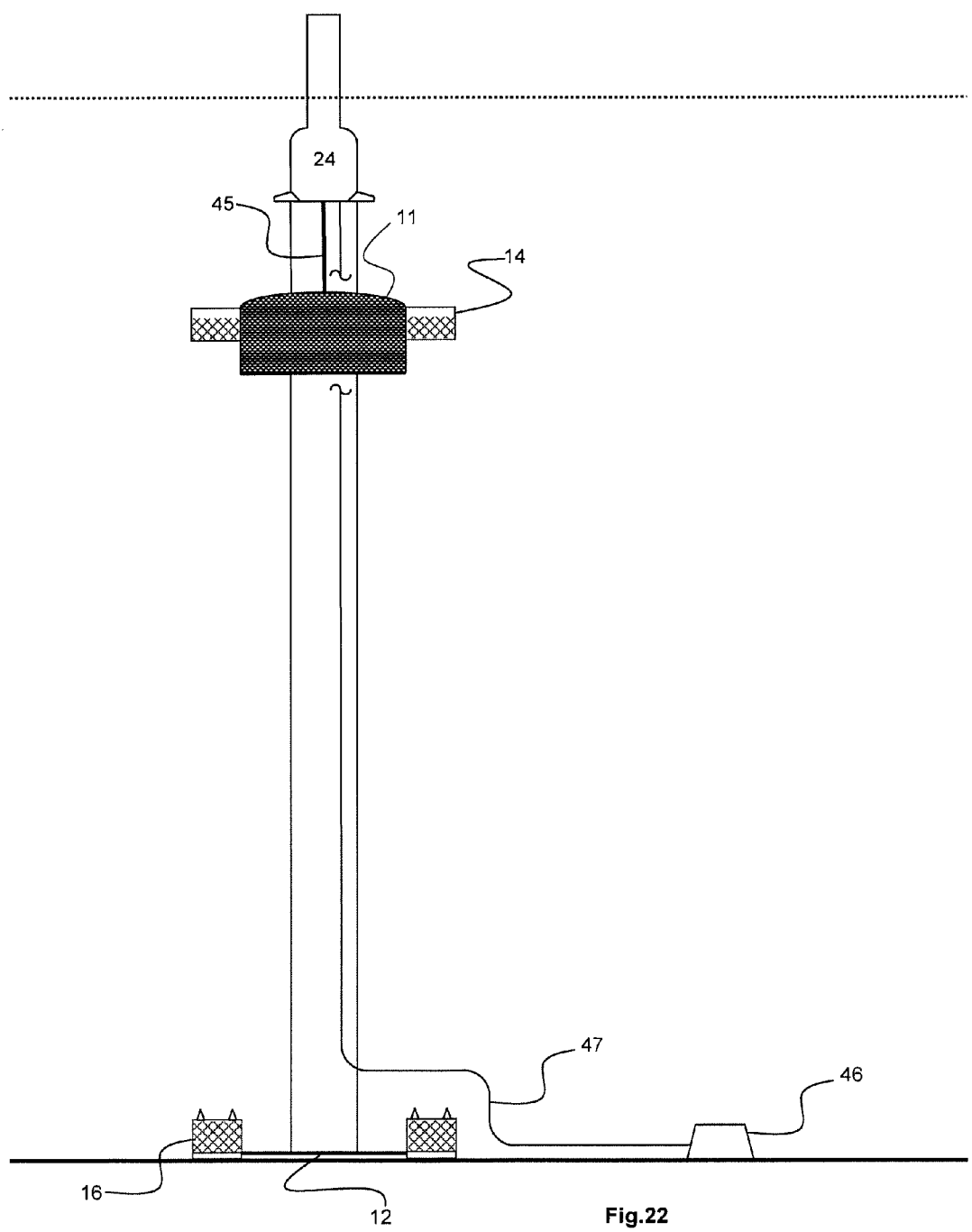
FIG. 22 illustrates a deep water operational system with gravity base on the seabed tethering the tank which is not lowered onto the gravity base.

In a deepwater situation, the storage tank 11 is not allowed to descend beyond the operational oil processing depth for temperature controlled stabilisation of produced oil in the storage tank 11. A gravity base is deployed on the seabed, and the equipment required to make up an operational system are tethered to the gravity base. (FIG. 22). A wellhead is connected by a riser to a production buoy 24 which is in turn connected to a submerged but suspended separation and storage tank 11 by an umbilical for transferring produced oil to the storage tank 11.

Figure 11:
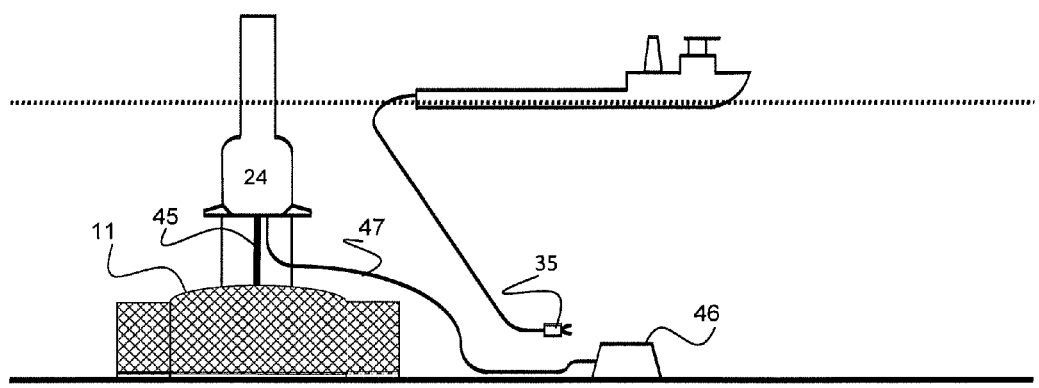
FIG. 11 illustrates connection of wellhead production risers to buoy, commission and start up.
Figure 12:
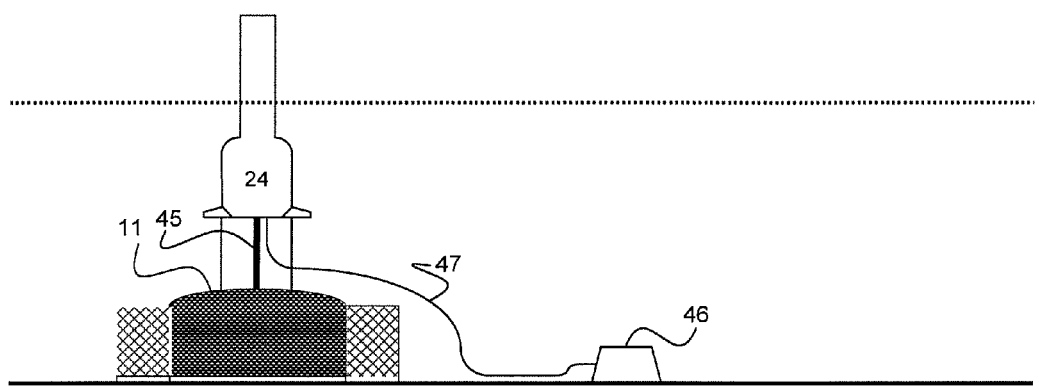
FIG. 12 illustrates an operational system with a wellhead connected by riser to a production buoy which in turn is connected to the separation and storage facility by an umbilical tubular for transferring produced oil to the tank of the facility.
Figure 13:
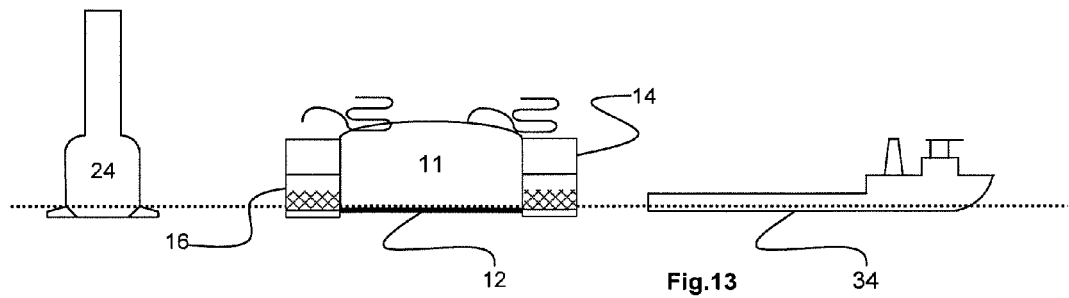
FIG. 13 illustrates the separate installation of the tank and base by separating the tank from the base and flooding base ballast tanks.
Figure 14:
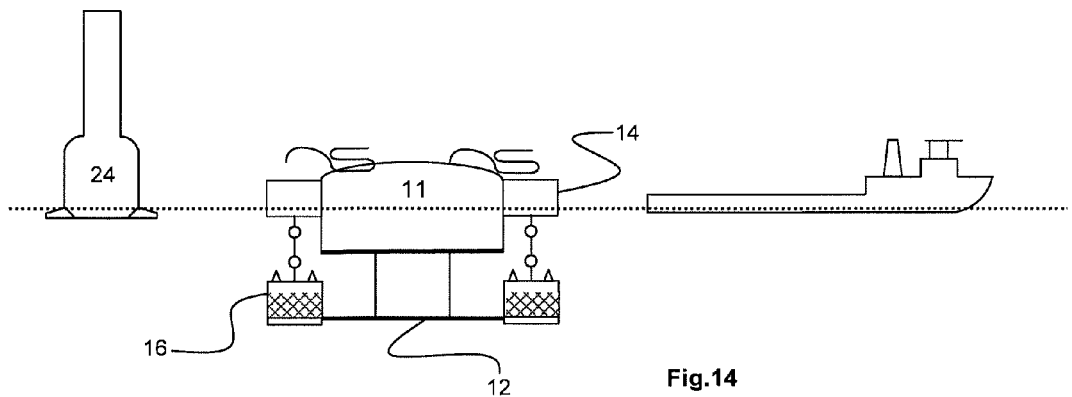
FIG. 14 illustrates the separation of gravity base from the tank and initial lowering of the base.
Figure 15:
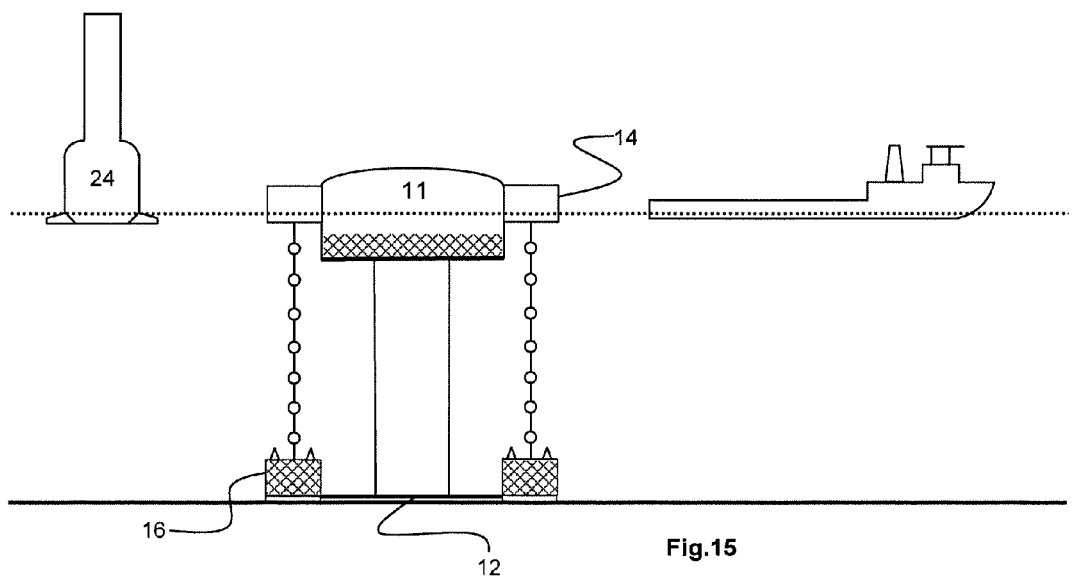
FIG. 15 illustrates the gravity base settled on the seabed and located in place.
Figure 16:
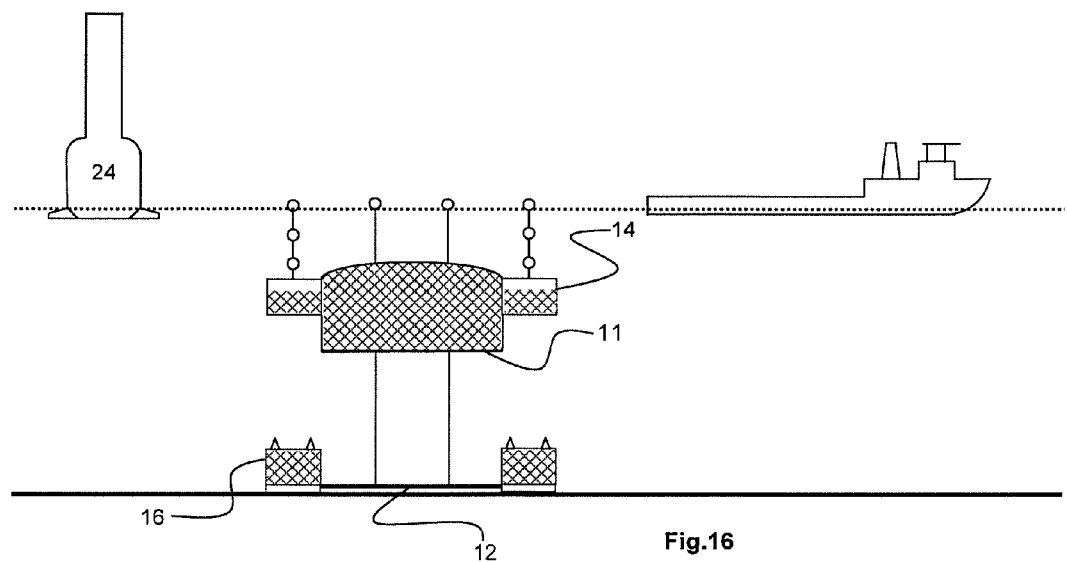
FIG. 16 illustrates the tank being guided and lowered on to the gravity base.
Figure 17:
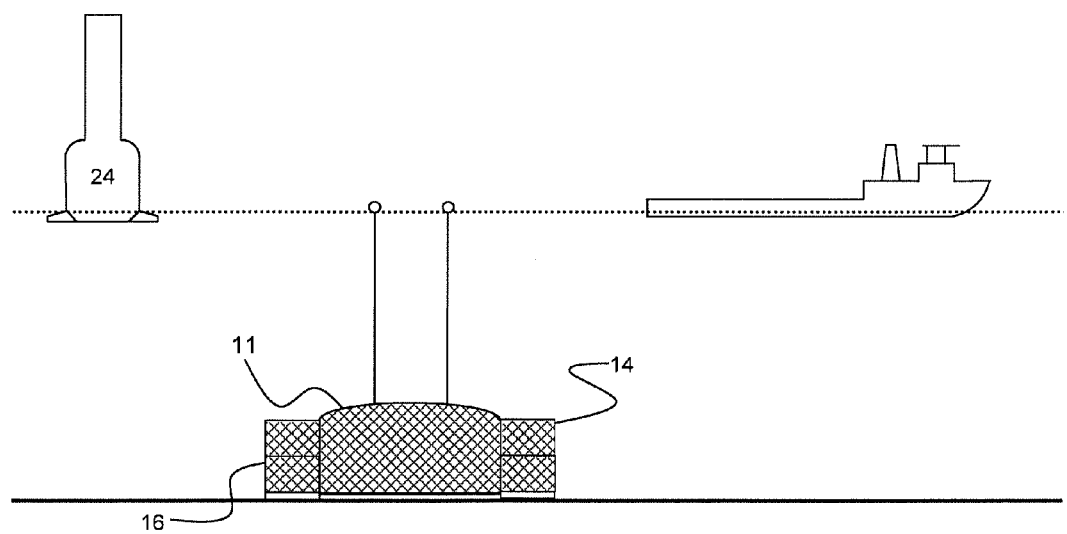
FIG. 17 illustrates the tank located and locked on to the gravity base on the seabed.
Figure 18:
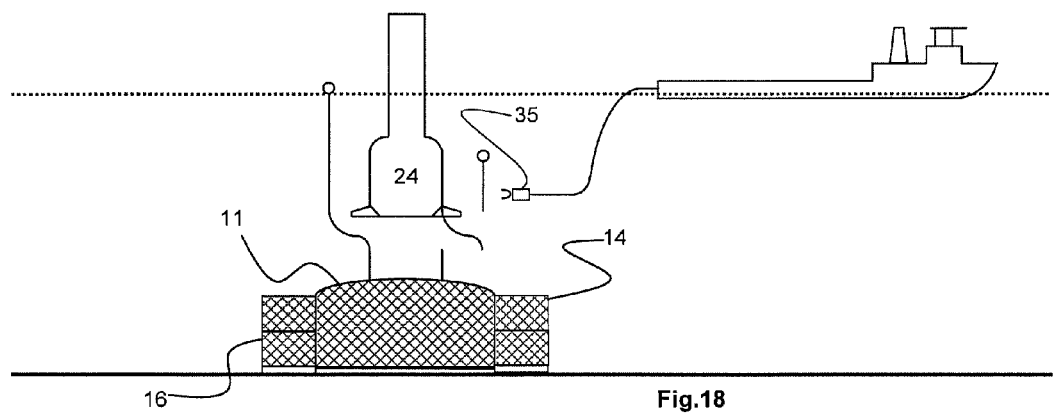
FIG. 18 illustrates the buoy being located above the tank/base and ballasted to below tether tension depth.
Figure 19:
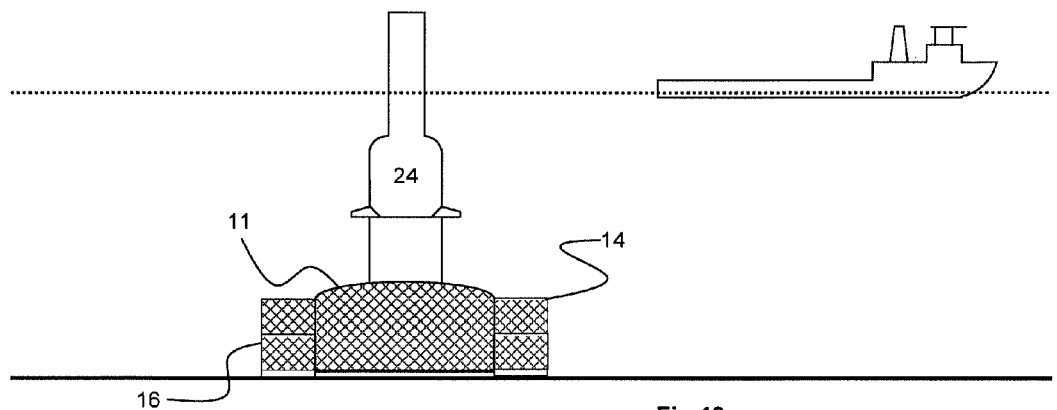
FIG. 19 illustrates the buoy tethered to the tank/base and ballasted to operational depth.
Figure 20:
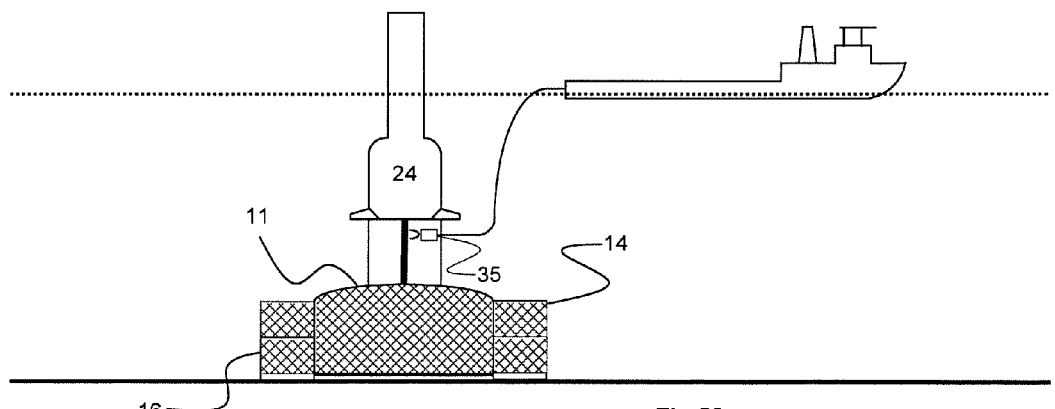
FIG. 20 illustrates connection of central riser from the tank to the buoy using an ROV controlled from the support vessel.
Figure 21:
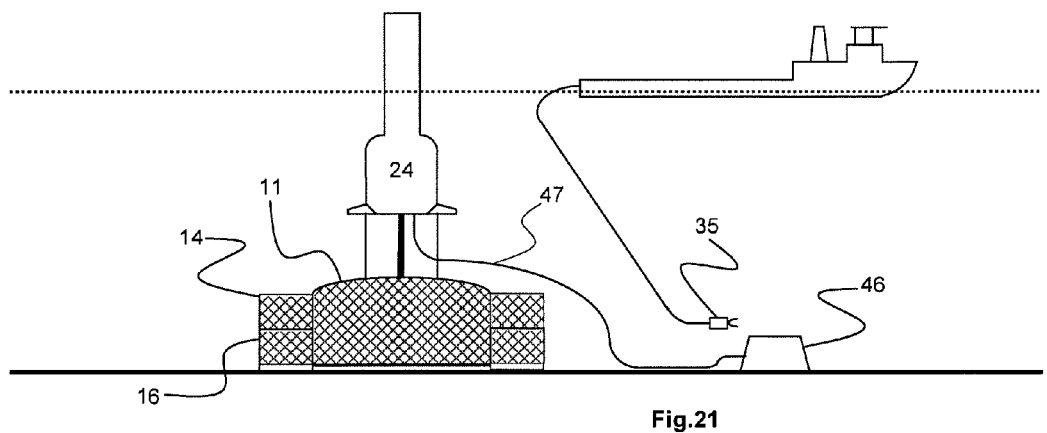
FIG. 21 illustrates connection of wellhead production risers to buoy, commission and start-up.

A riser 45 between the storage tank 11 and the buoy 24 (FIG. 10) is connected by use of an ROV 35 operated from one of the service vessels/tugs 34, and then the production risers 47 are connected between the wellhead(s) 46 and the buoy 24 (FIG. 11).

When the time comes for recovery of the storage tank 11 for re-deployment elsewhere, the recovery procedure is generally the reverse of deployment (FIGS. 23 to 31).

Figure 23:
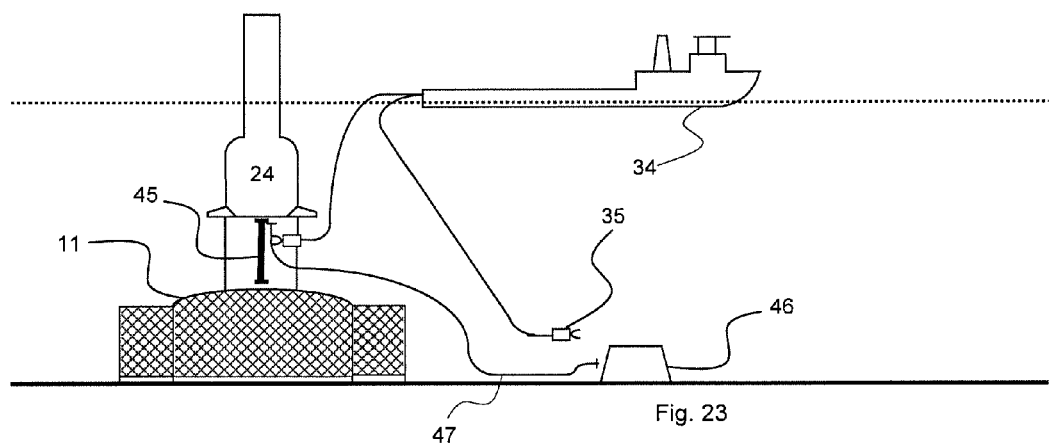
FIG. 23 illustrates an ROV from the supply vessel uncoupling and removing flexible production and central riser.
Figure 24:
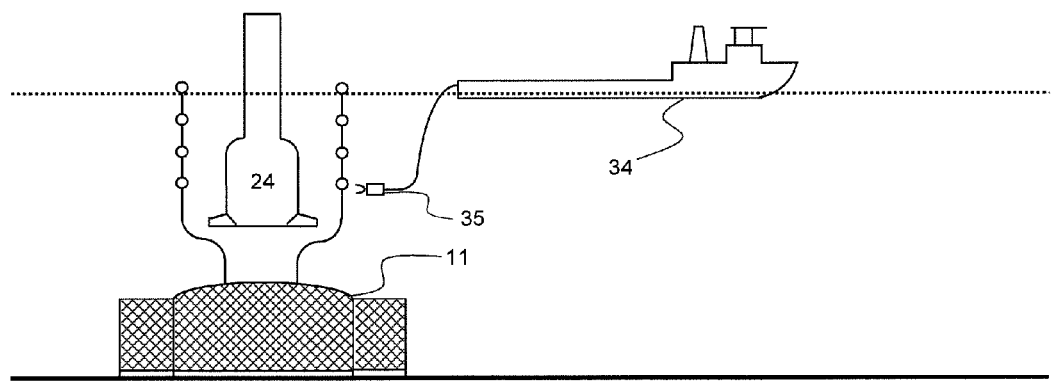
FIG. 24 illustrates buoy ballasted to remove tension from tethers, tethers decoupled from buoy using davit on buoy or ROV, and marker/ballast buoys attached to base.
Figure 25:
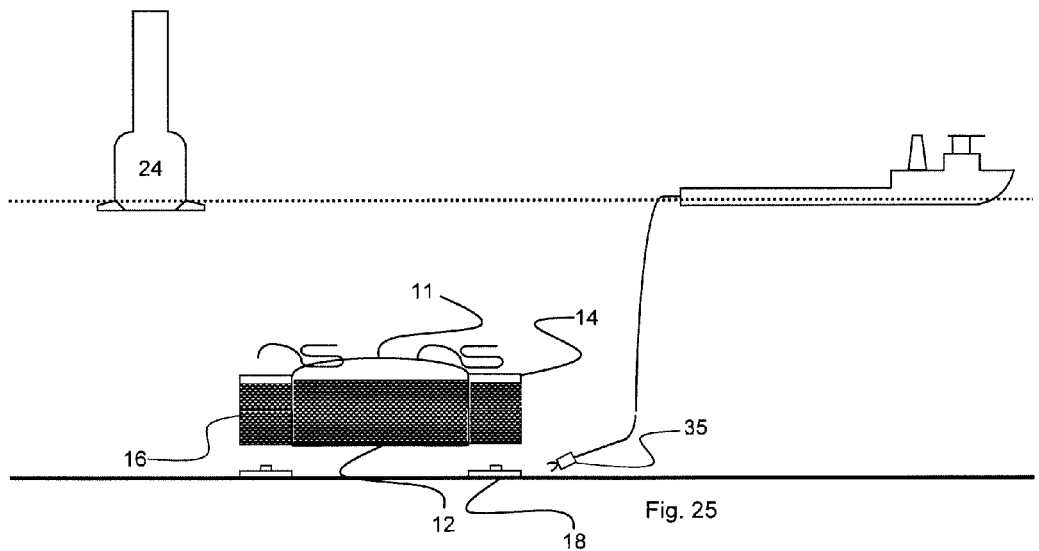
FIG. 25 illustrates the detachment and ballasting of tank from the gravity base feet.
Figure 26:
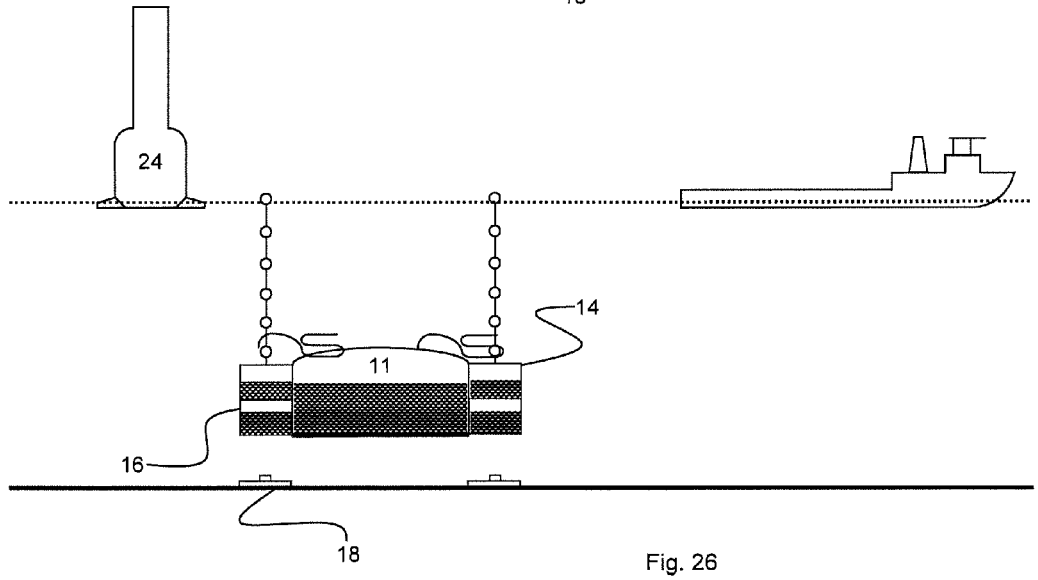
FIG. 26 illustrates the raising of tank and gravity base to the surface.

The flexible and central risers 45, 47 would be uncoupled and removed in the initial stages of recovery (FIG. 23). Then the buoy 24 would be ballasted down to release tension in the tethers 25 to the storage tank 11, the tethers 25 would be decoupled e.g. by use of a davit crane (not shown) on the buoy 24 or by use of an ROV 35, to separate the buoy 24 and storage tank 11 (FIG. 24).

Figure 27:
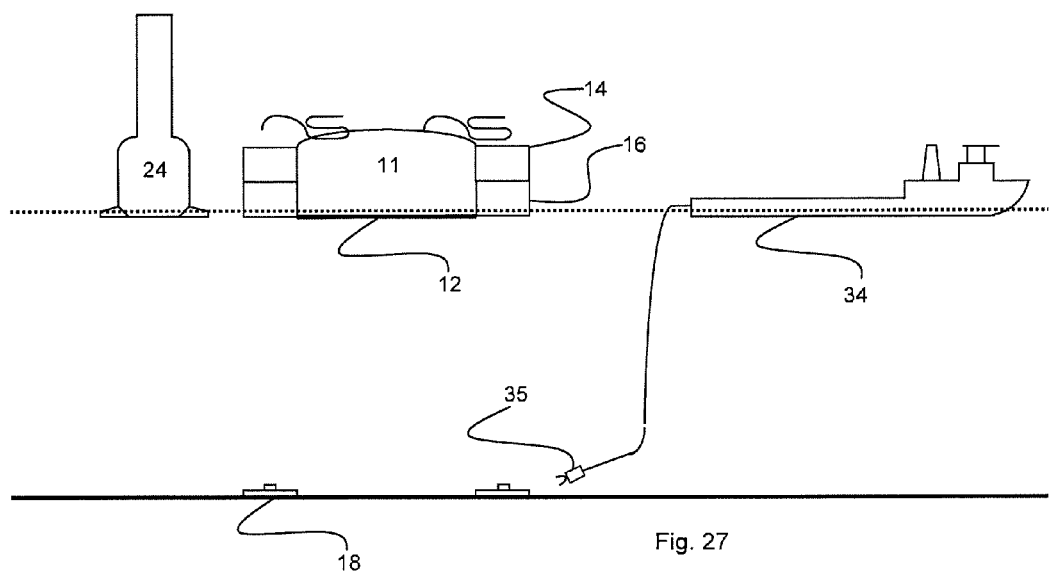
FIG. 27 illustrates the tank and gravity base recovered at surface, ballasted for tow out, with ROV from vessel deployed to recover feet.
Figure 28:
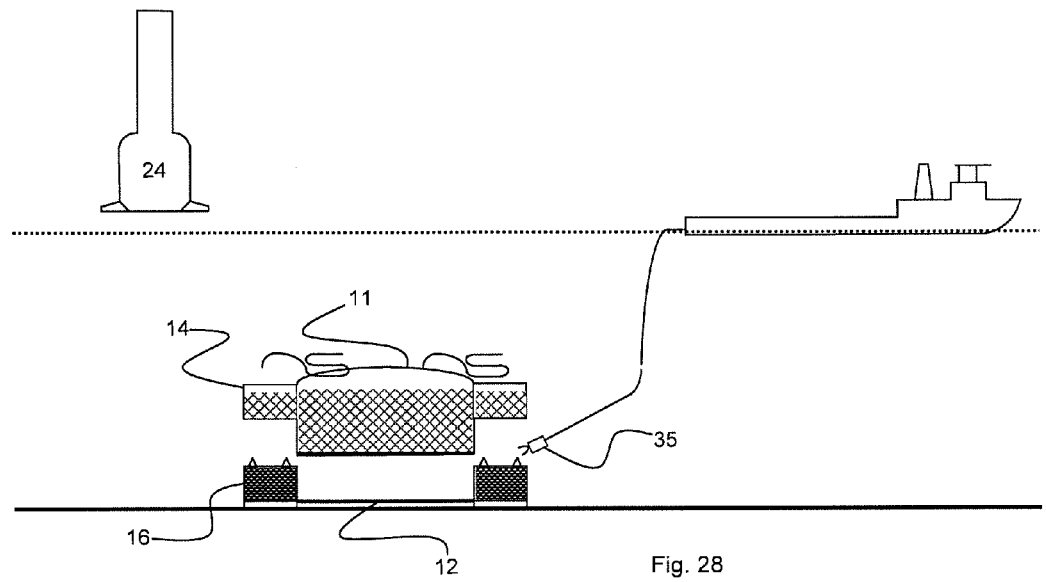
FIG. 28 illustrates a multiple unit recovery with the separation of the tank from the gravity base after uncoupling risers etc.
Figure 29:
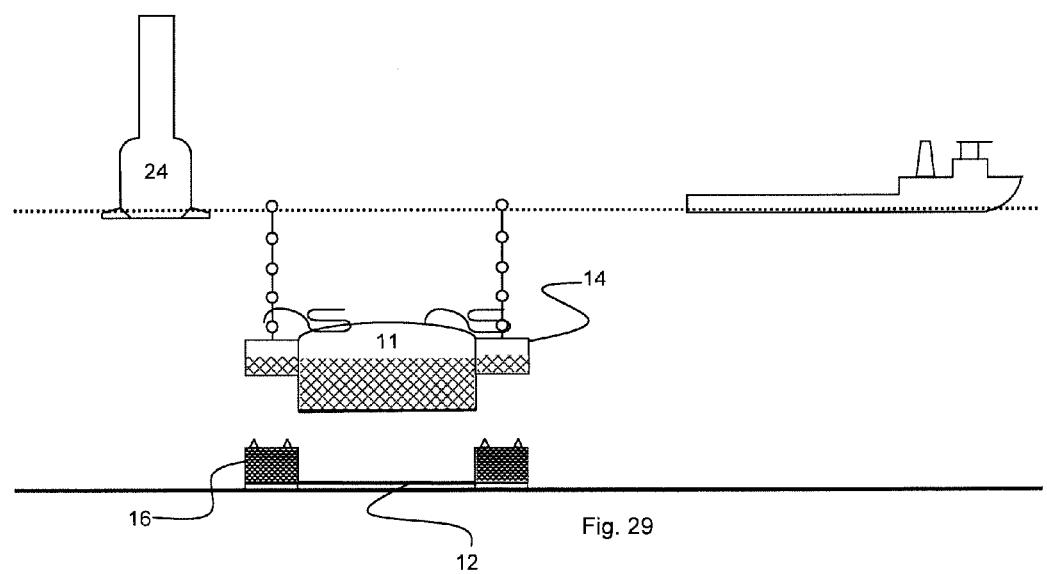
FIG. 29 illustrates inflating of the ballast tanks and raising the tank to the surface.
Figure 30:
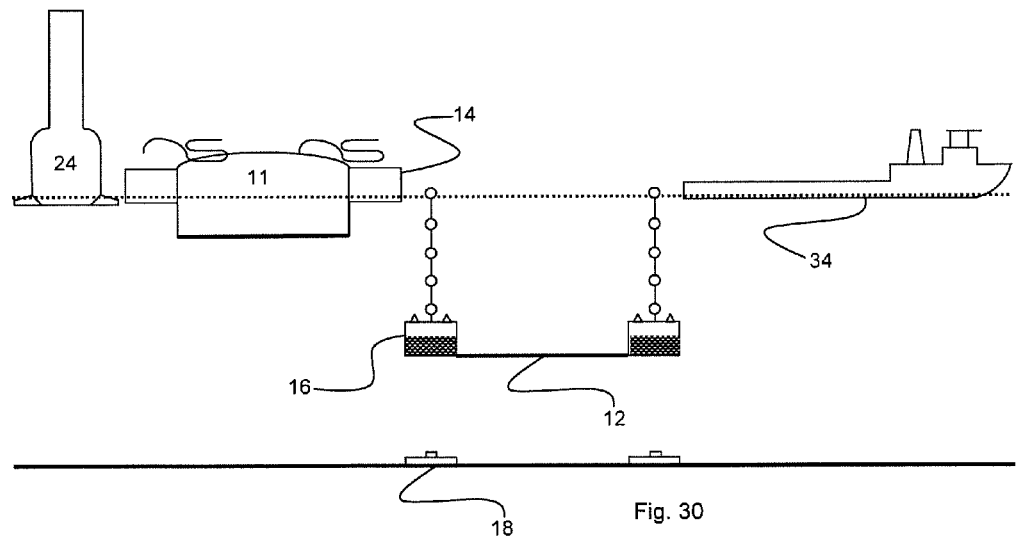
FIG. 30 illustrates the tank ballasted at surface and detaching the gravity base from the detachable feet, ballasting the gravity base to the surface.
Figure 31:
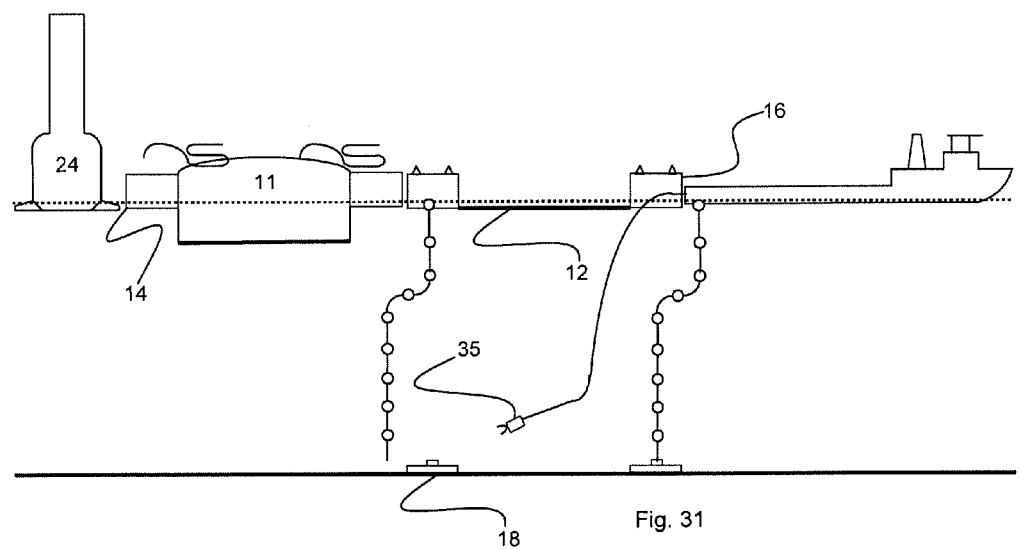
FIG. 31 illustrates an ROV from vessel recovering detachable feet.
Figure 32:
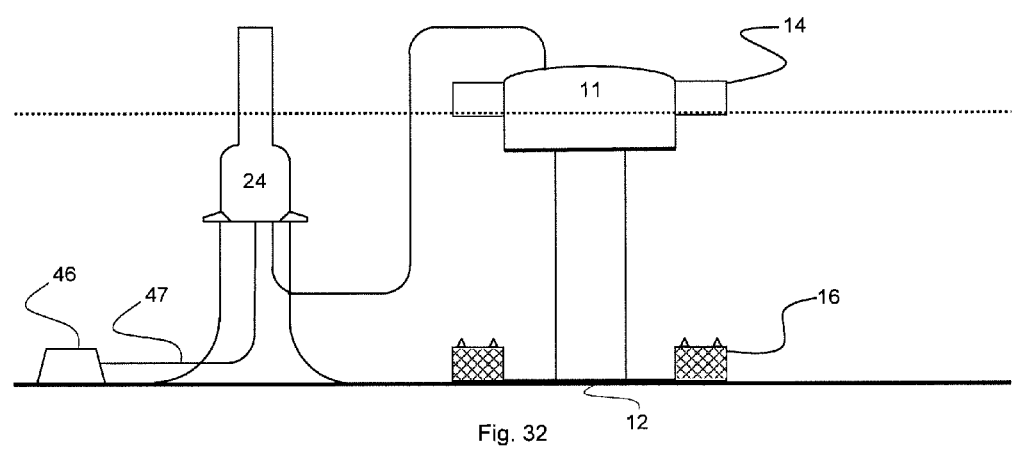
FIG. 32 illustrates a variant where the buoy moored to the seabed adjacent to a well with the tank tethered to the gravity base.

Then after de-ballasting the buoy 24 to tow depth, the storage tank 11 recovery operation can be undertaken. The storage tank 11 and base 12 can either be recovered together (FIGS. 25 and 26) or in separate operations (FIGS. 28, 29 and 30), and in either case it may be suitable to separate the base from the detachable feet 18 and recover these separately using an ROV (FIGS. 27 and 31). If the storage tank 11 is to be recovered first, then it is unlatched from the gravity base 12 (FIG. 28), and de-ballasted to encourage recovery to surface (FIG. 29). Additional buoyancy device use and or crane lifting may be appropriate to facilitate recovery. The storage tank 11 is ballasted for tow away (FIG. 30), and the recovery of the base 12 is undertaken in a similar fashion (FIGS. 30 and 31). The package of buoy, tank and base can then be towed away using the service vessels or tugs in attendance.

The production buoy, oil stabilisation and storage tank, gravity base and separable feet are all capable of being re-used at another location.

Figure 33:
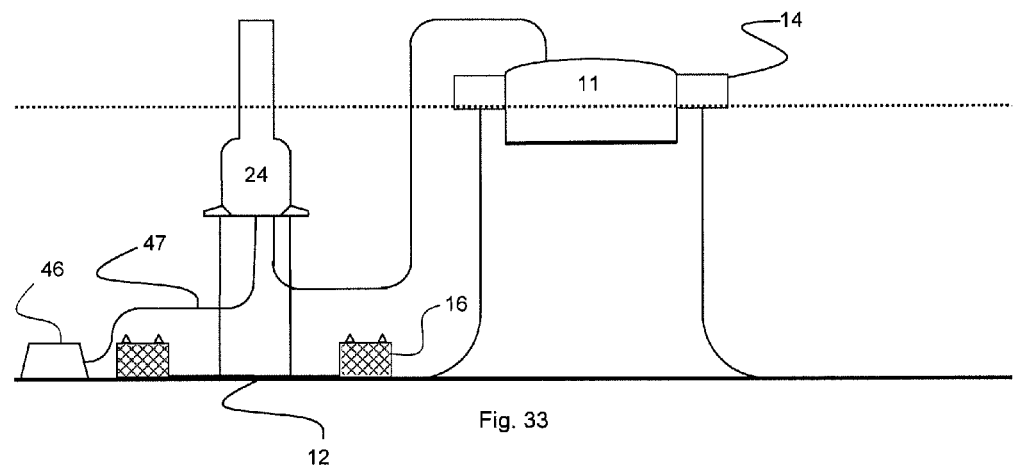
FIG. 33 illustrates tank tethered to the gravity base with tank moored adjacent to the buoy.

In alternative configurations for operations either:
A. The buoy is moored and the tank floats on the surface tethered to the seabed (FIG. 39), or
B. The buoy is tethered to the seabed and the tank floating on the surface is spread moored (FIG. 33).

In an emergency situation during flaring, the storage facility with associated production facility can manage up to 30 million standard cubic feet of well gases per day.

Figure 34:
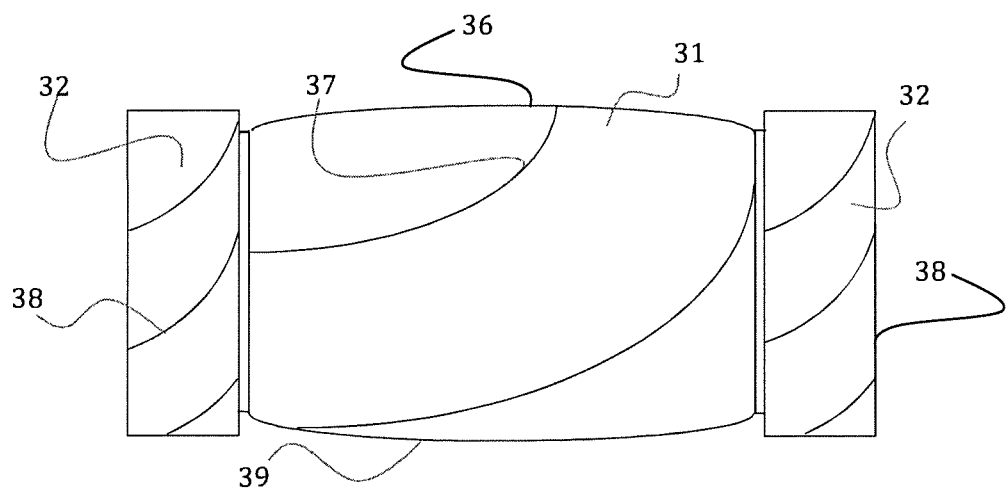
FIG. 34 illustrates schematically a side view of an embodiment of a sub-sea storage facility comprising a tank and associated ballast tanks.
Figure 35:
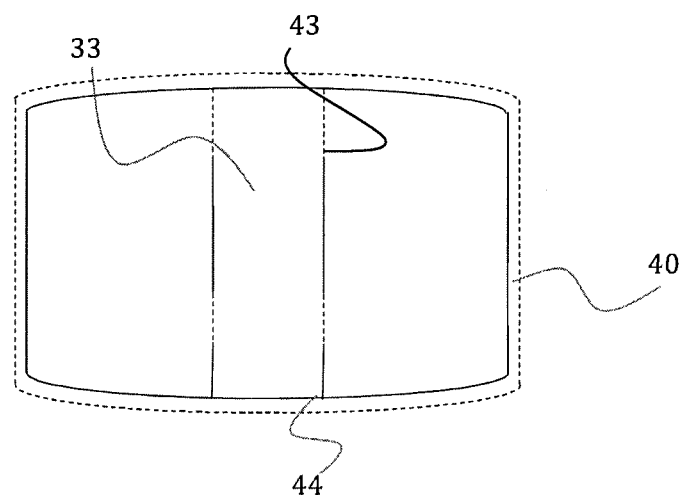
FIG. 35 illustrates schematically an internal cross-section of the tank embodiment illustrated in FIG. 34.

In another embodiment of the tank, as illustrated in FIG. 34, the tank 31 has a dished head 36 and oppositely oriented dished base 39. The side wall of the tank 31 is provided with curved strakes 37 to serve as vortex shedders. The associated ballast tanks 32 are removable pods, and these also have curved strakes 38 on the side walls for the same purpose of mitigating vortex effects. A cross-sectional side view of the embodiment of FIG. 34, shown in FIG. 35 shows the tank 31 is constructed with a twin wall 40. The twin wall may accommodate thermal insulation material. The interior of the tank 31 has a central separator zone 33 defined within a column wall, the zone being configured to receive produced oil for stabilisation by separation of water and volatiles under a temperature controlled stabilisation process. The upper part 43 of the column wall may be permeable to gas, for example slotted or otherwise foraminated. In embodiments, the lower part of the column wall 44 may define a sludge collection zone above which the column wall is fluid permeable.

The dished head 36, and the dished base 39 of the tank 31 may have a centrally positioned external connection for a collection conduit such as gas offtake, or sediment/sludge/solids removal may be usefully employed with convex shaped inner tank surfaces since gas will tend to collect at the highest point internally of the tank, and gravity will draw heavy fluids and solids to the lowest point internally of the tank. The lowest point may be provided with a weir or internal sludge confinement wall.

In embodiments with the rounded dished head 36 and rounded dished base 39 the tank may be operated with a design pressure of 8 bar. Temperature distribution in a tank of this shape is improved. The dished configuration facilitates both gas collection at the head of the tank, and also sludge collection at the base of the tank.

Construction with a double skin wall permits installation of thermal insulation material which allows an operational design temperature of 140° C.

Embodiments may be used in a variety of processes including:
1. A process for separation of water and volatiles, especially n-isobutane, from oil produced from a reservoir which comprises collecting oil in a submerged tank which is at a depth allowing temperature-based separation of water and volatiles from the oil over a period of from about 8 to 60 days or more.
2. A process for separation of water and volatiles from oil produced from a reservoir wherein the submerged tank is at a depth below sea level of up to 120 meters.
3. A process for separation of water and volatiles from oil produced from a reservoir wherein produced gas is throttled to limit produced gas to a quantity sufficient to satisfy fuel requirements for use in providing heat for the separation process.
4. A process for separation of water and volatiles from oil produced from a reservoir wherein production flow is controlled by one or more operations selected from the group consisting of choking production at the wellhead, controlling pump speed (e.g. ESP) and lift rate.
5. A process for separation of water and volatiles from oil produced from a reservoir wherein heat is supplied to the produced oil when necessary to achieve a stabilisation temperature of up to 80° C. in the tank.
6. A process for separation of water and volatiles from oil produced from a reservoir wherein prior to collecting oil in the submerged tank the oil produced from the reservoir is subjected to at least one of de-gassing and de-sanding under controlled temperature conditions.

7. A process for separation of water and volatiles from oil produced from a reservoir wherein flow is maintained by use of at least one of an electrical submerged pump (ESP), an electrical submerged progressive cavity pump (ESPCP) and seawater injection pump.

8. A process for separation of water and volatiles from oil produced from a reservoir useful for water depths exceeding 120 m, wherein the tank is separated from the gravity base and the configuration can be used in deep water (exceeding 2,000 m water depth).

9. A process for separation of water and volatiles from oil produced from a reservoir wherein the tank depth is set according to volatiles, partial vapour pressures and the ability to remove n-isobutane via heating up to 80° C.

10. A process for handling reservoir fluids by deploying a tank with an optionally separable base, wherein the base can be opened as part of an emergency response function and located in position by a guide located over a BOP and/or well.

11. A process for handling reservoir fluids by deploying a tank with an optionally separable base, where in emergency response mode, heating of the tank fluids as part of lowering the tank in situ, inhibits formation of hydrates.

12. A process for handling reservoir fluids by deploying a tank with an optionally separable base, where under emergency flaring up to 30 million standard cubic feet per day of well gasses is managed.

The invention claimed is:

1. A method of treating and recovering production fluids from a subsea well, the method comprising connecting a first riser between a surface buoy and the well and supplying production fluids from the well through the first riser to the buoy, connecting a second riser between the buoy and a subsea storage tank for holding and separating fluids, the subsea storage tank including a single water/oil storage volume, the method including processing the fluids supplied to the buoy from the first riser to remove gas from the production fluids, supplying the de-gassed production fluids through the second riser to the subsea storage tank, separating water from oil within the subsea storage tank by maintaining a temperature profile of the fluids stored in the subsea storage tank, and exporting separated oil from the subsea storage tank following the separation of the water and the oil within the tank, wherein the method includes compartmentalising the single water/oil storage volume of the tank with at least one separator in the form of a baffle wherein the step of separation of the water and the oil within the tank comprises flowing gasses through a foraminated upper portion of the baffle, containing sludge within sludge containment zones between lower parts of the baffle, and flowing liquids through the baffle above the sludge containment zones and below the foraminated upper portion of the baffle, wherein said steps of flowing gasses, containing sludge and flowing liquids are performed within the subsea storage tank before export of the separated oil from the subsea storage tank.

2. The method according to claim 1, including removing gas from the oil contained within the subsea storage tank before exporting the oil from the subsea storage tank, wherein the step of removing gas is performed within the subsea storage tank.

3. The method according to claim 1, including heating the fluids within the subsea storage tank prior to exporting the fluids from the subsea storage tank.

4. The method according to claim 1, including submerging the subsea storage tank at an intermediate depth between a sea bed and a sea surface while treating the fluids within the subsea storage tank.

5. The method according to claim 1, including insulating the subsea storage tank against heat loss during the treatment of the fluids.

6. The method according to claim 1, including removing n-isobutane from the fluids stored in the subsea storage tank before exporting the fluids from the subsea storage tank.

7. The method according to claim 1, including removing sand from the fluids in the buoy before supplying the fluids to the subsea storage tank through the second riser.

8. The method according to claim 1, including maintaining the subsea storage tank at an intermediate depth between the sea bed and the buoy during the separation of water from oil within the subsea storage tank.

9. A method as claimed in claim 1, the method including minimising impact of inward and outward fluid flow disturbance upon the separating fluids in the storage tank.

10. A method as claimed in claim 1, including supplying heat to the fluids in the subsea storage tank and including generating the heat on the buoy and transferring the heat generated on the buoy to the subsea storage tank.

11. A method as claimed in claim 1, including consuming gas on the buoy to provide power to heat the fluids in the subsea storage tank.

12. A method as claimed in claim 1, including separating gas from liquids in the subsea storage tank, and returning gas to the buoy through a balance line for treatment of the gas in the buoy.

13. A method as claimed in claim 1, including returning water separated from the oil within the subsea storage tank to the buoy.

14. A method as claimed in claim 13, including discharging water that has returned from the subsea storage tank to the buoy into the sea.

15. A method as claimed in claim 1, including flowing water from the buoy to the subsea storage tank and displacing oil separated from water in the subsea storage tank into an oil export line.

16. A method as claimed in claim 1, including connecting a first end of the second riser to the buoy, and a second end of the second riser to the subsea storage tank.

17. A method of treating and recovering production fluids from a subsea well, the method comprising connecting a first riser between a surface buoy and the well and supplying production fluids from the well through the first riser to the buoy, connecting a first end of a second riser to the buoy and connecting a second end of the second riser to a subsea storage tank for holding and separating fluids, processing the fluids supplied to the buoy from the first riser to remove gas from the production fluids, supplying the de-gassed production fluids through the second riser to the subsea storage tank, separating water from oil within the subsea storage tank by maintaining a temperature profile of the fluids stored in the subsea storage tank, exporting oil from the subsea storage tank following the separation of the water and the oil within the tank, and returning at least some of the water separated from oil in the subsea storage tank back to the buoy.

18. A method as claimed in claim 17, including discharging at least some of the water returned to the buoy into the sea.

19. A method as claimed in claim 17, wherein the subsea storage tank comprises a single water/oil storage volume, wherein the method includes compartmentalising the single water/oil storage volume of the tank with at least one separator in the form of a baffle wherein the step of separation of the water and the oil within the tank comprises flowing gasses through a foraminated upper portion of the baffle, containing sludge within sludge containment zones between lower parts of the baffle, and flowing liquids through the baffle above the sludge containment zones and below the foraminated upper portion of the baffles, wherein said steps of flowing gasses, containing sludge and flowing liquids are performed within the subsea storage tank before export of the separated oil from the subsea storage tank.

20. A method of treating and recovering production fluids from a subsea well, the method comprising connecting a first riser between a surface buoy and the well and supplying production fluids from the well through the first riser to the buoy, connecting a second riser between the buoy and a subsea storage tank for holding and separating fluids, processing the fluids supplied to the buoy from the first riser to remove gas from the production fluids, supplying the degassed production fluids through the second riser to the subsea storage tank, separating water from oil within the subsea storage tank by maintaining a temperature profile of the fluids stored in the subsea storage tank, flowing water from the buoy to the subsea storage tank and displacing oil separated from water in the subsea storage tank and exporting separated oil from the subsea storage tank following the separation of the water and the oil within the tank.

\* \* \* \* \*